US008752168B2

(12) United States Patent
Itakura

(10) Patent No.: US 8,752,168 B2
(45) Date of Patent: Jun. 10, 2014

(54) NON-TRANSITORY COMPUTER READABLE MEDIUM STORING ACCESS RIGHTS UPDATE PROGRAM, ACCESS RIGHTS MANAGEMENT SYSTEM, AND ACCESS RIGHTS UPDATE METHOD

(71) Applicant: Fuji Xerox Co., Ltd., Tokyo (JP)

(72) Inventor: Yasumasa Itakura, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 13/644,253

(22) Filed: Oct. 3, 2012

(65) Prior Publication Data

US 2013/0247176 A1 Sep. 19, 2013

(30) Foreign Application Priority Data

Mar. 19, 2012 (JP) ................................. 2012-062374

(51) Int. Cl.
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |

(52) U.S. Cl.
USPC .......................................................... 726/21

(58) Field of Classification Search
USPC .......................................................... 726/21
See application file for complete search history.

(56) References Cited

U.S. PATENT DOCUMENTS

| 2009/0265495 | A1* | 10/2009 | Murayama et al. ............ 710/240 |
| 2010/0228699 | A1* | 9/2010 | Webber et al. ................ 707/622 |
| 2010/0235429 | A1* | 9/2010 | Simonen et al. .............. 709/203 |
| 2011/0185350 | A1* | 7/2011 | Kawahata ...................... 717/171 |
| 2011/0219119 | A1* | 9/2011 | Murayama et al. ............ 709/225 |
| 2012/0124092 | A1* | 5/2012 | Teranishi et al. .............. 707/783 |

FOREIGN PATENT DOCUMENTS

| JP | A-2010-205183 | 9/2010 |
| JP | A-2011-13982 | 1/2011 |
| JP | A-2011-99736 | 5/2011 |

* cited by examiner

*Primary Examiner* — Kambiz Zand
*Assistant Examiner* — Stephen Sanders
(74) *Attorney, Agent, or Firm* — Oliff PLC

(57) ABSTRACT

Provided is a non-transitory computer readable medium storing an access rights update program causing a computer to be executed as: an acquisition unit that acquires access rights update information, which includes information specifying an object of personnel changes, a type of personnel changes, a changed organization, a delegate of access rights for a storage unit that stores a document, and an effective period of the access rights, before the personnel changes; a search unit that searches for the storage unit, for which access rights information including the effective period of the access rights is set and which needs to be updated, on the basis of the acquired access rights update information; and an update unit that updates the access rights information, which is set for the searched storage unit, before the personnel changes on the basis of the acquired access rights update information.

8 Claims, 19 Drawing Sheets

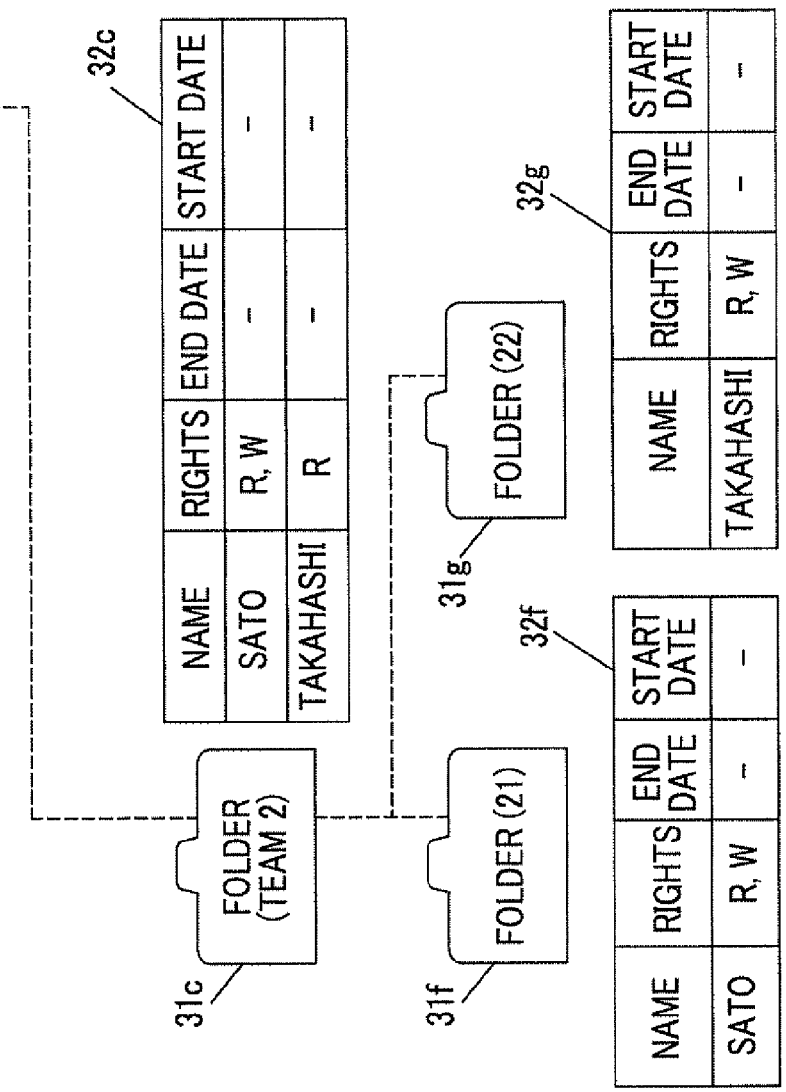
(FIG. 3 Continued)

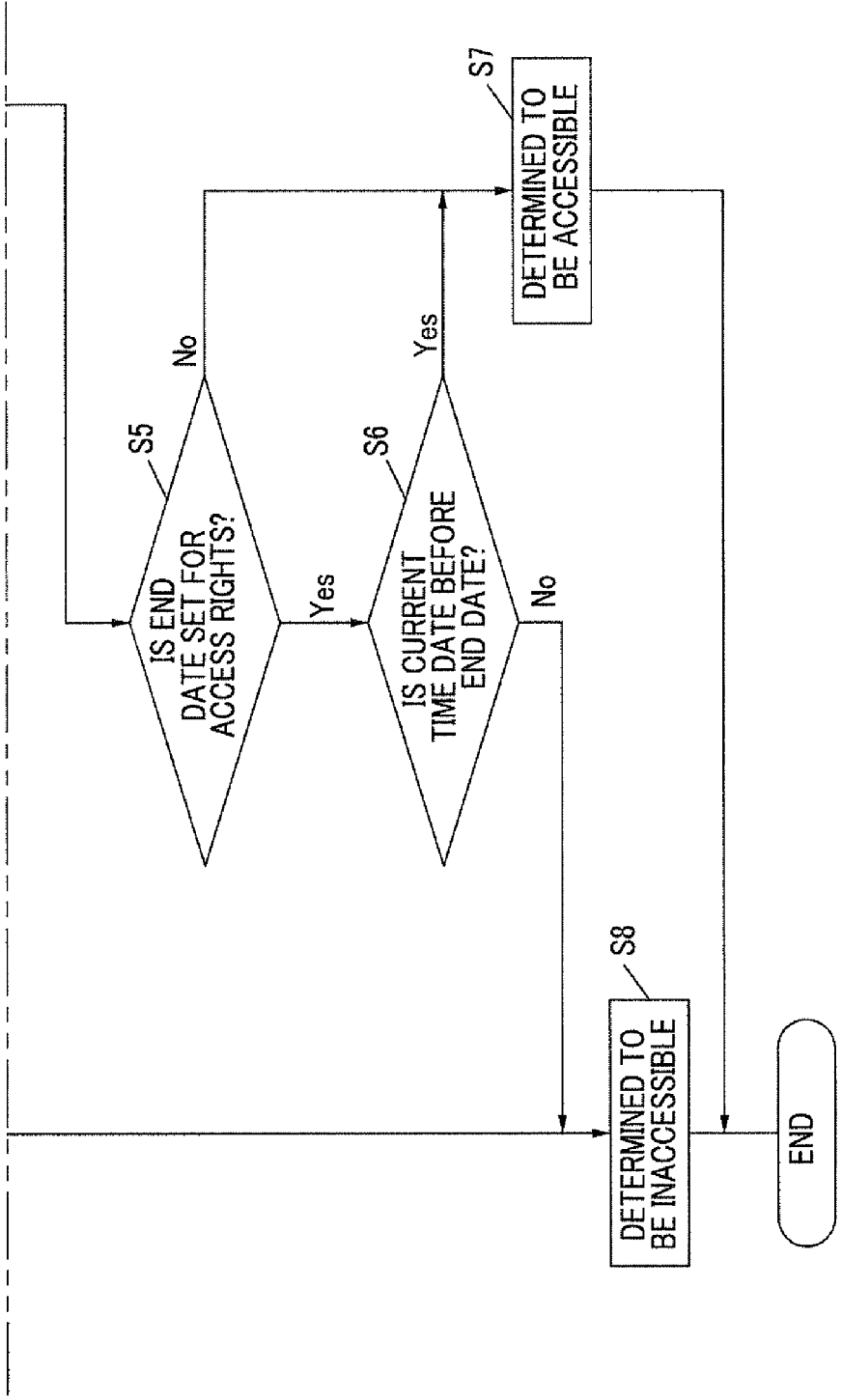

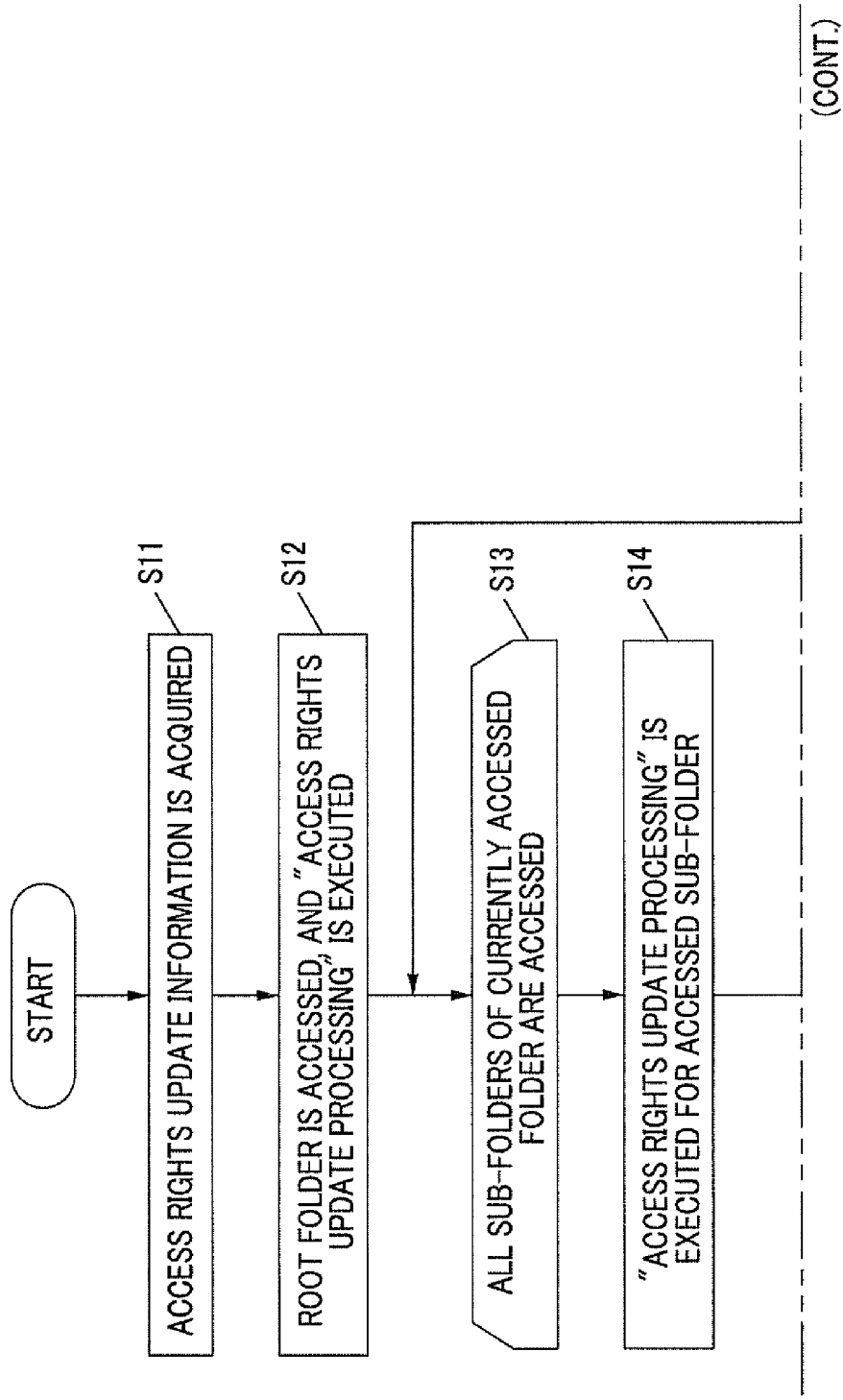

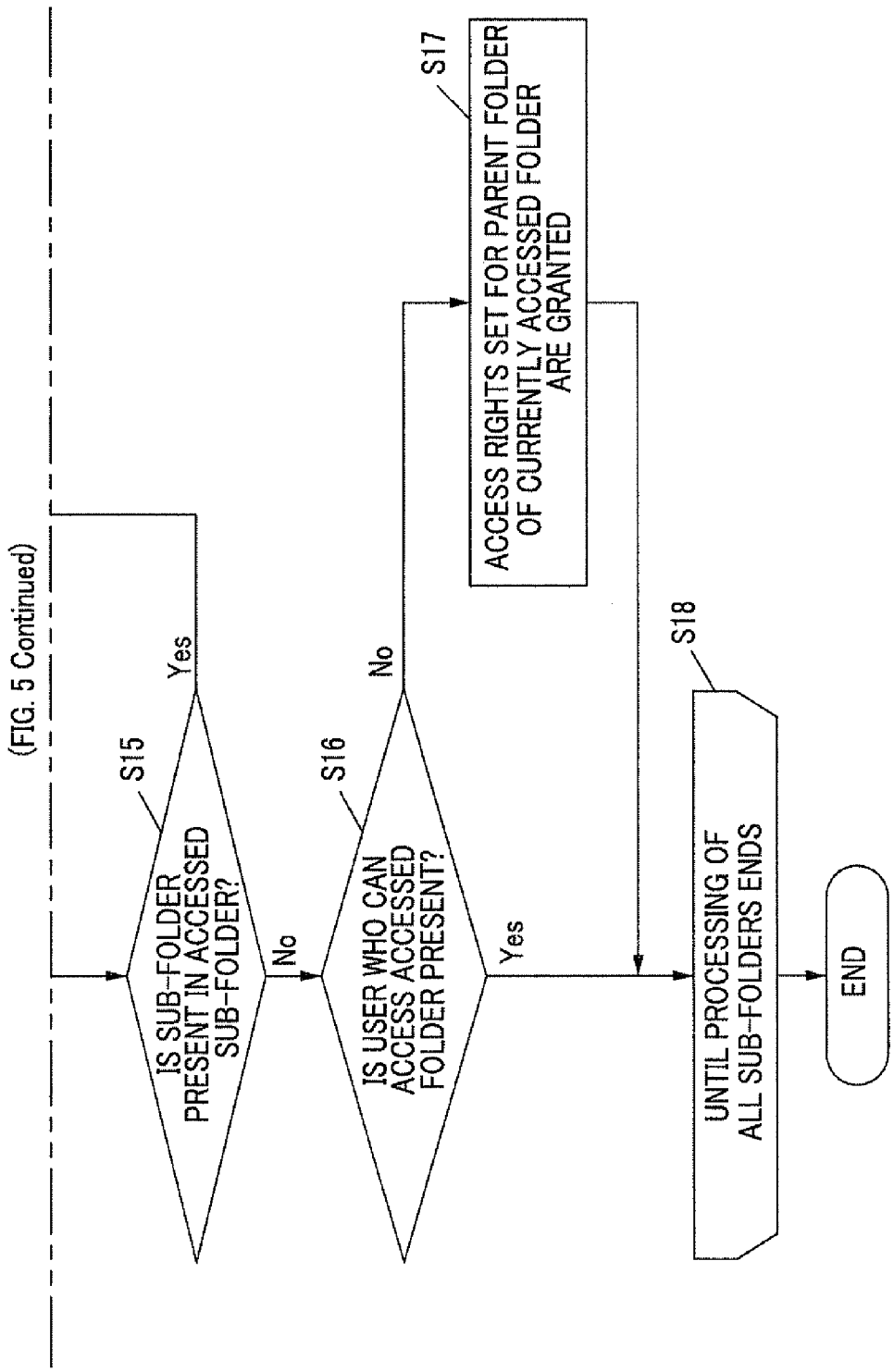

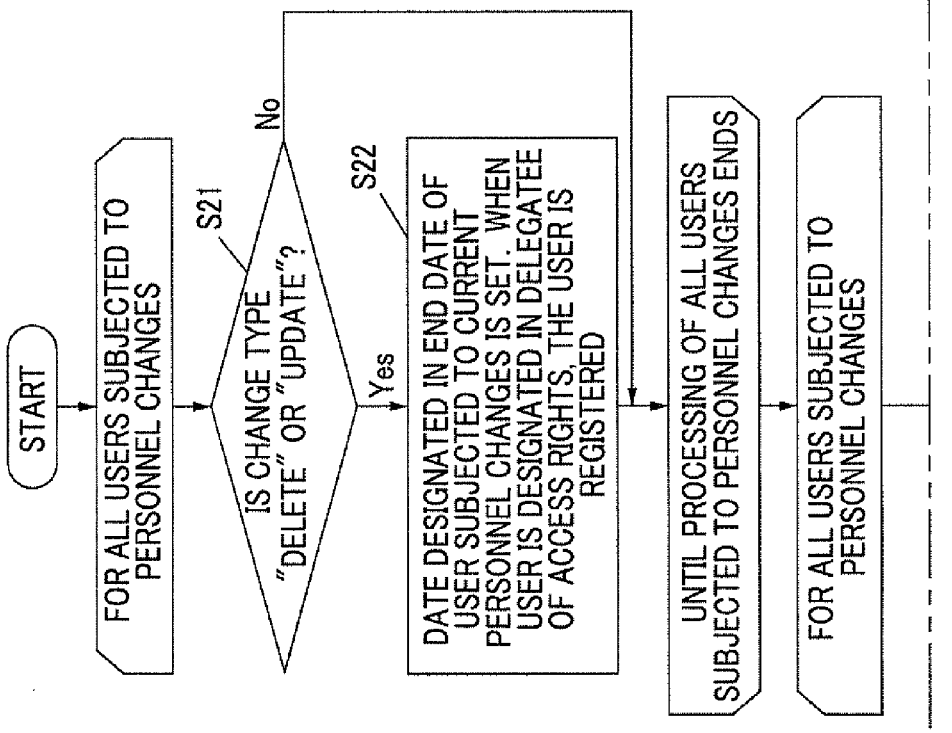

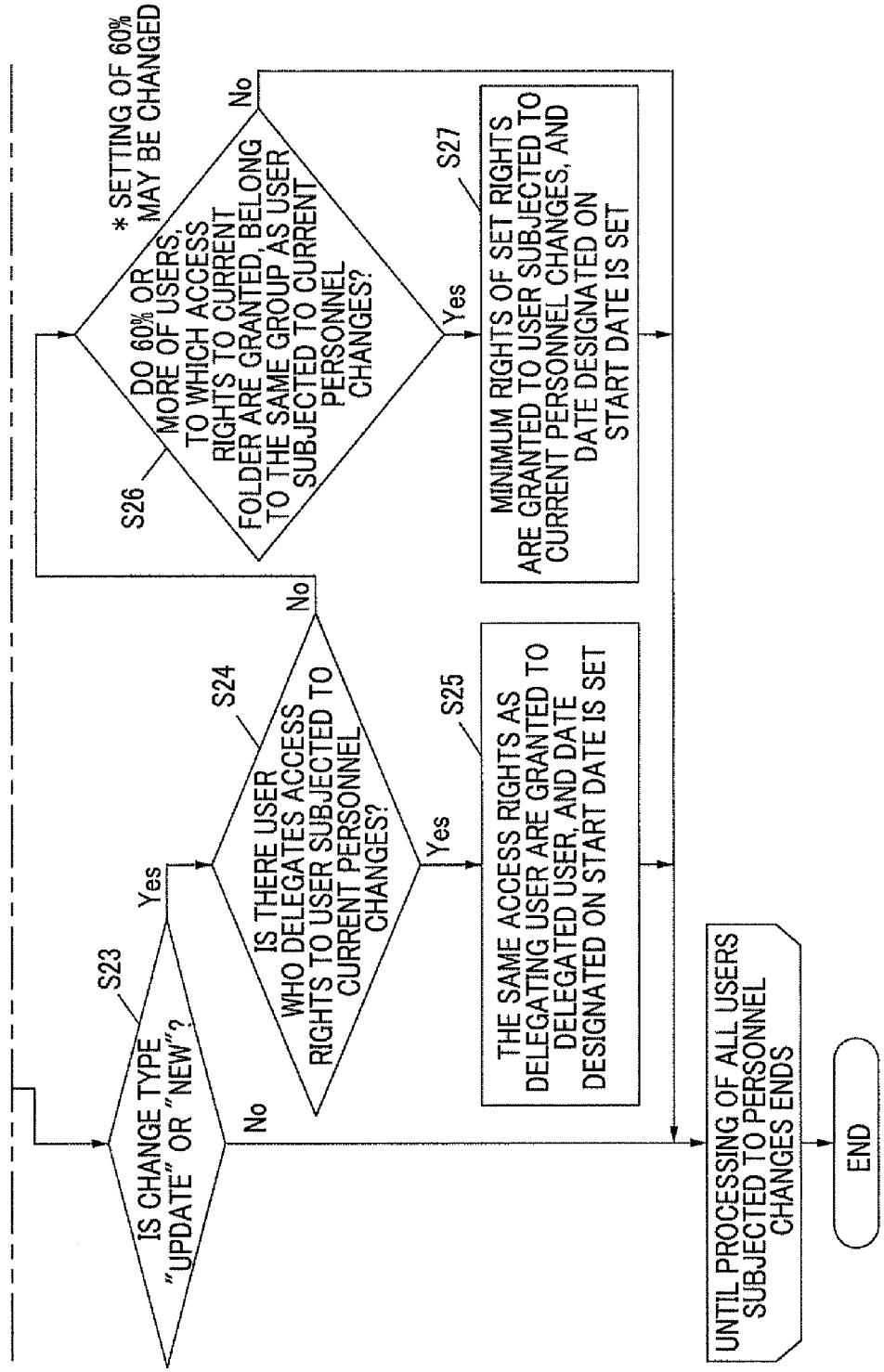

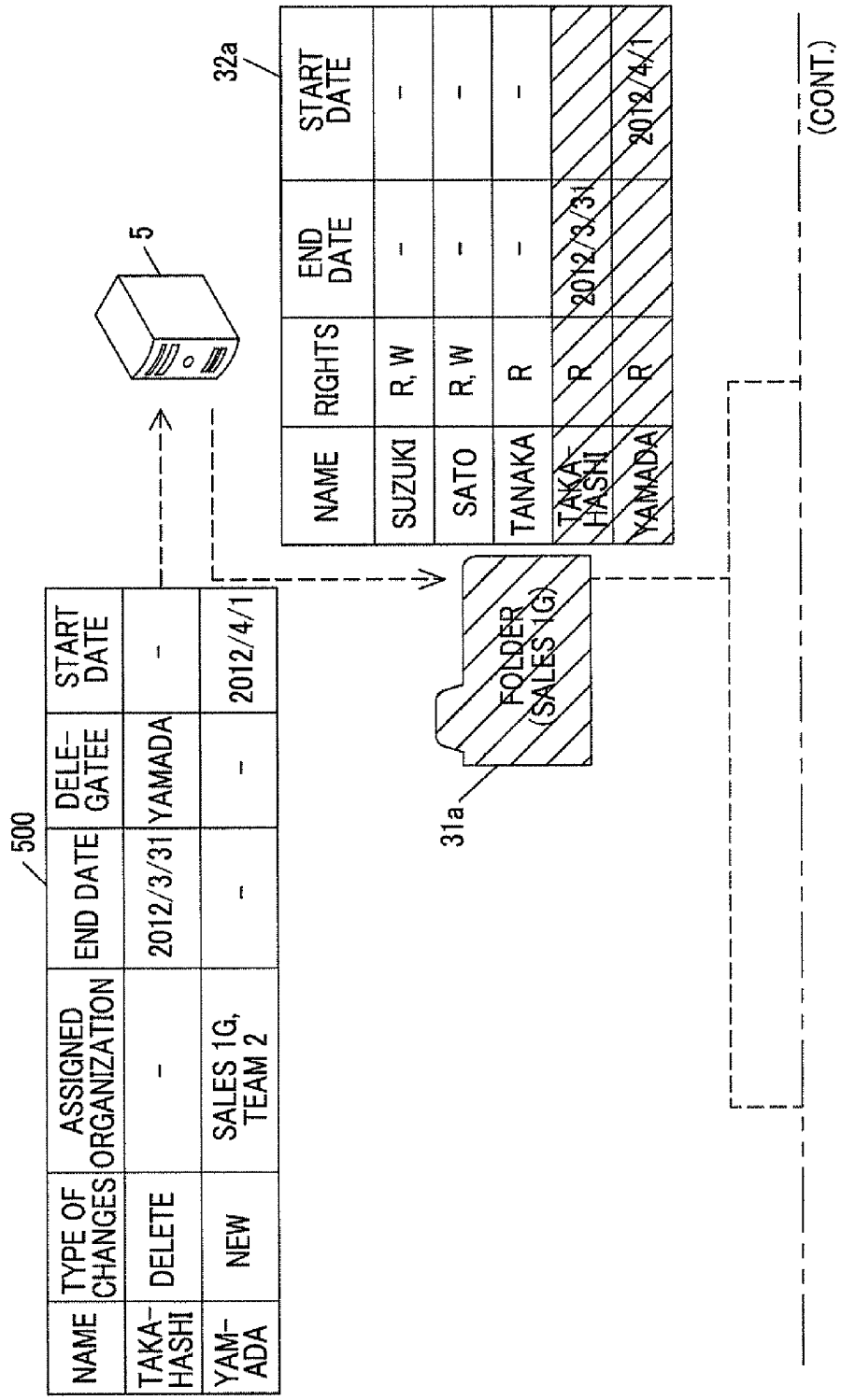

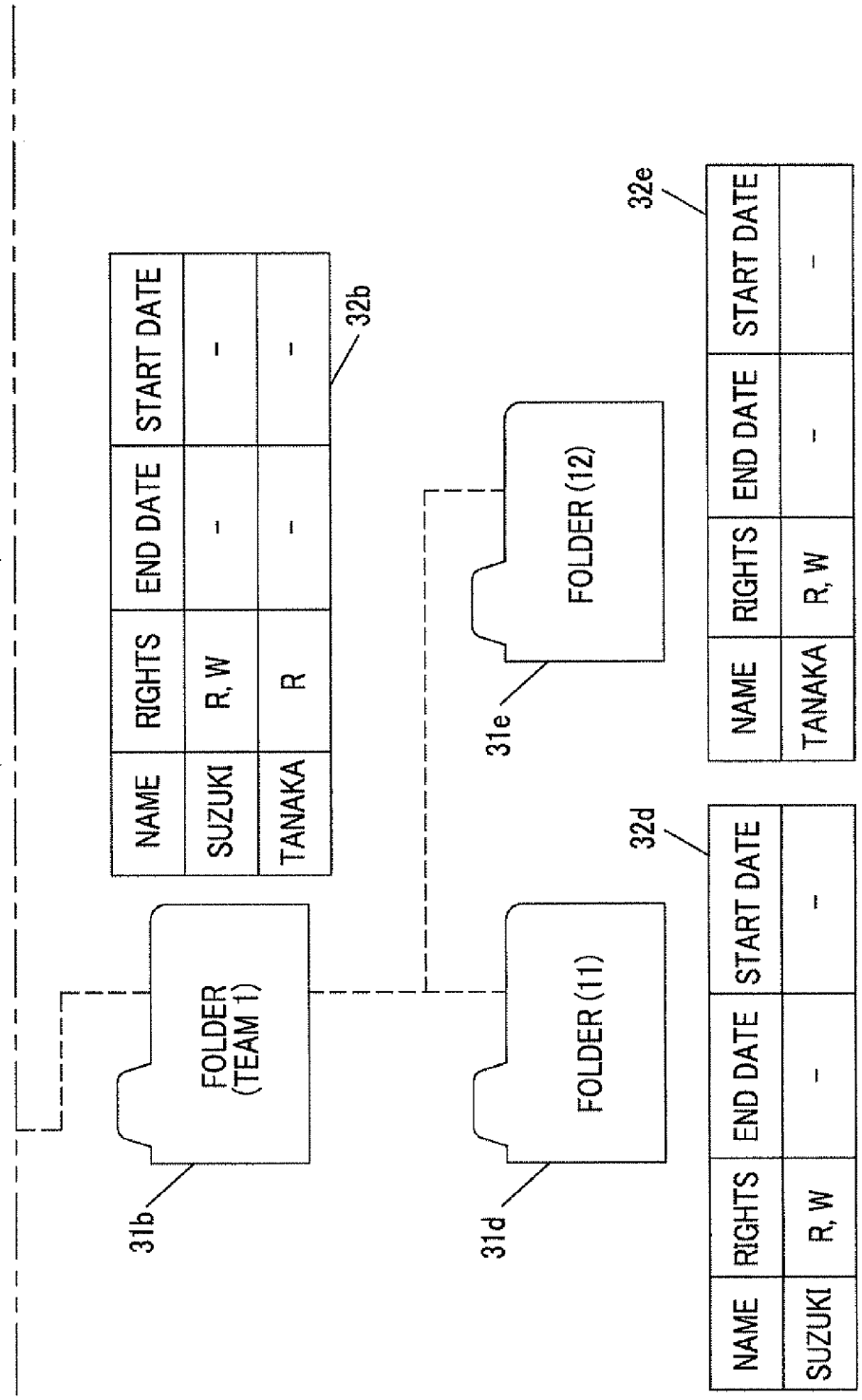
(FIG. 7 Continued)

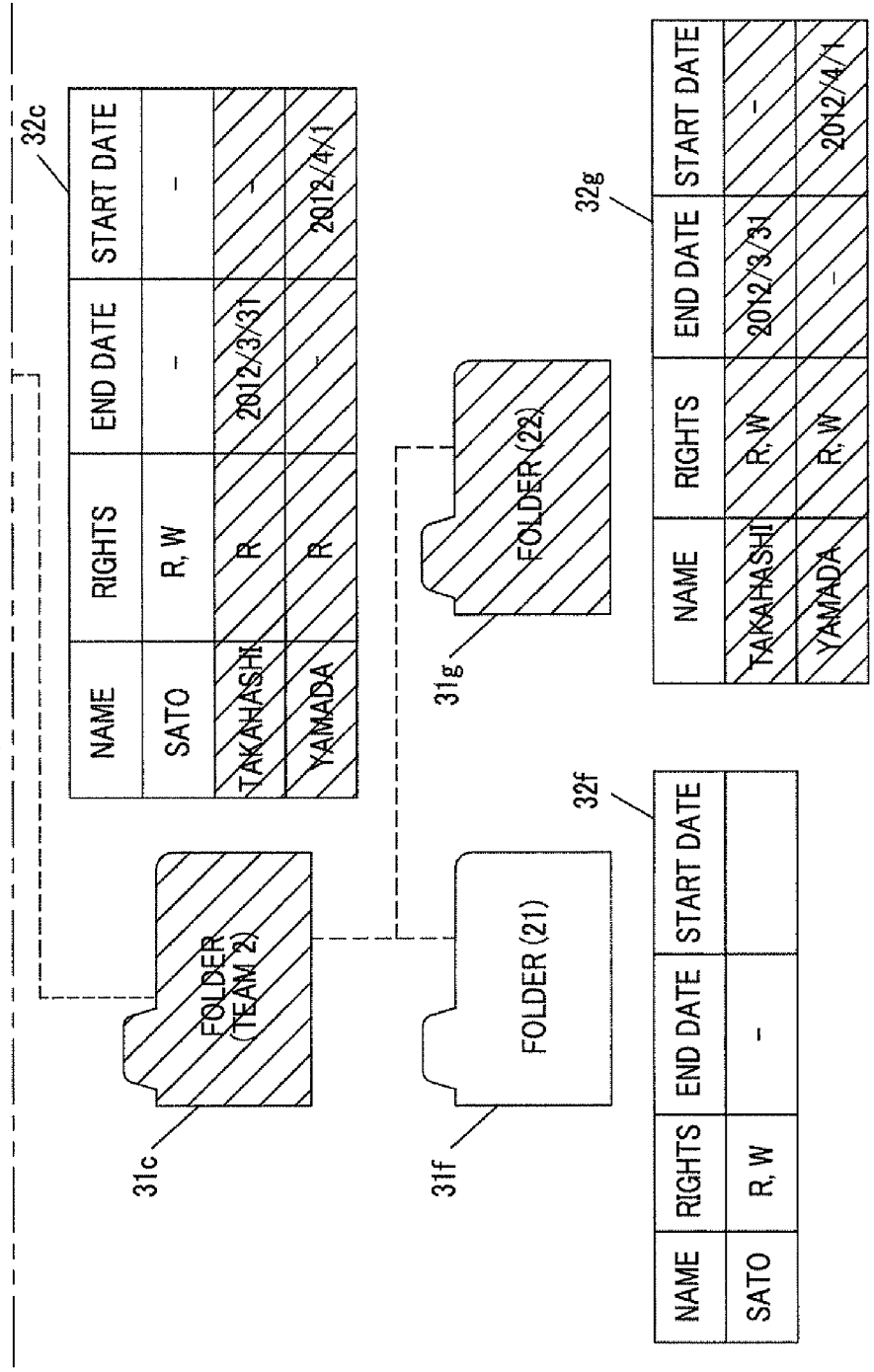

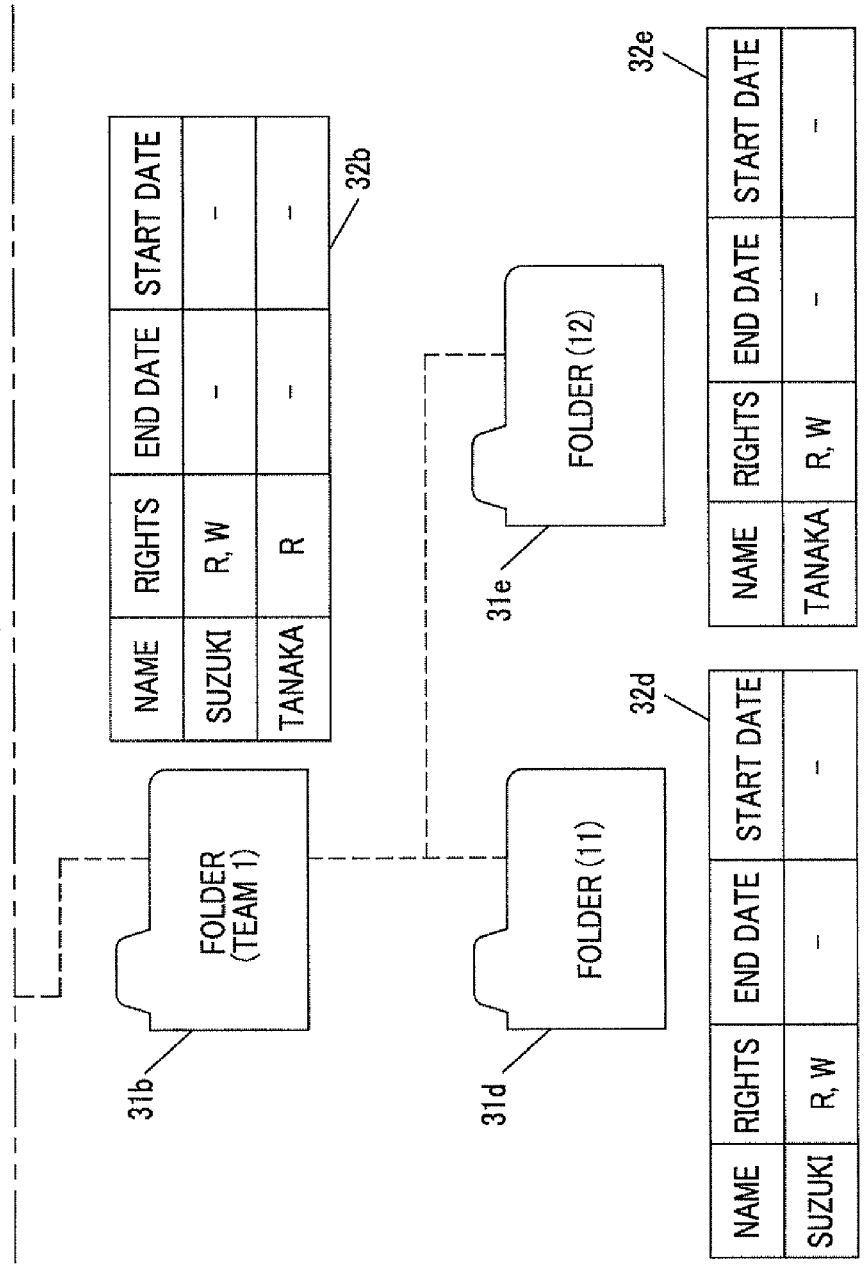
(FIG. 8 Continued)

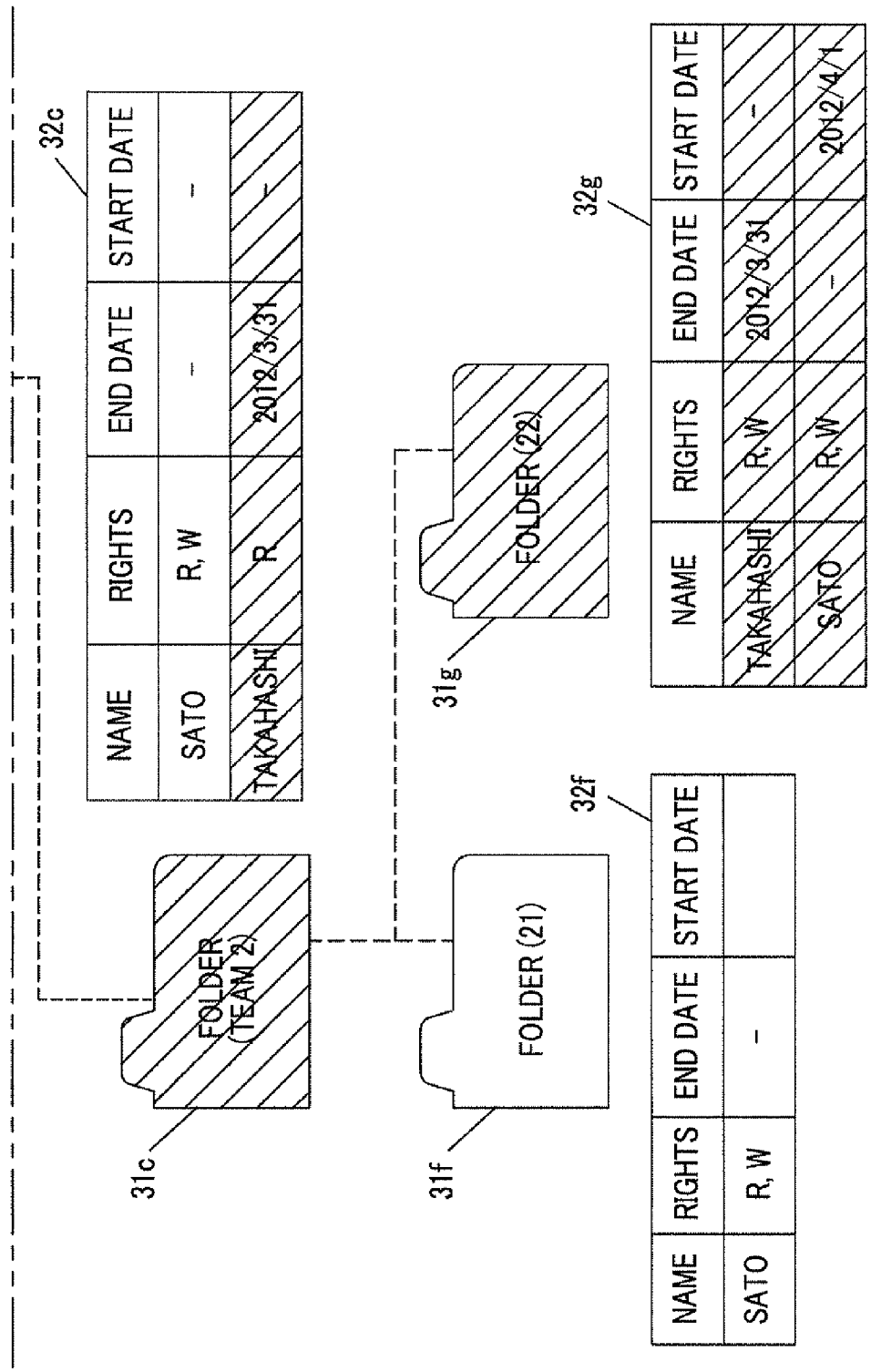

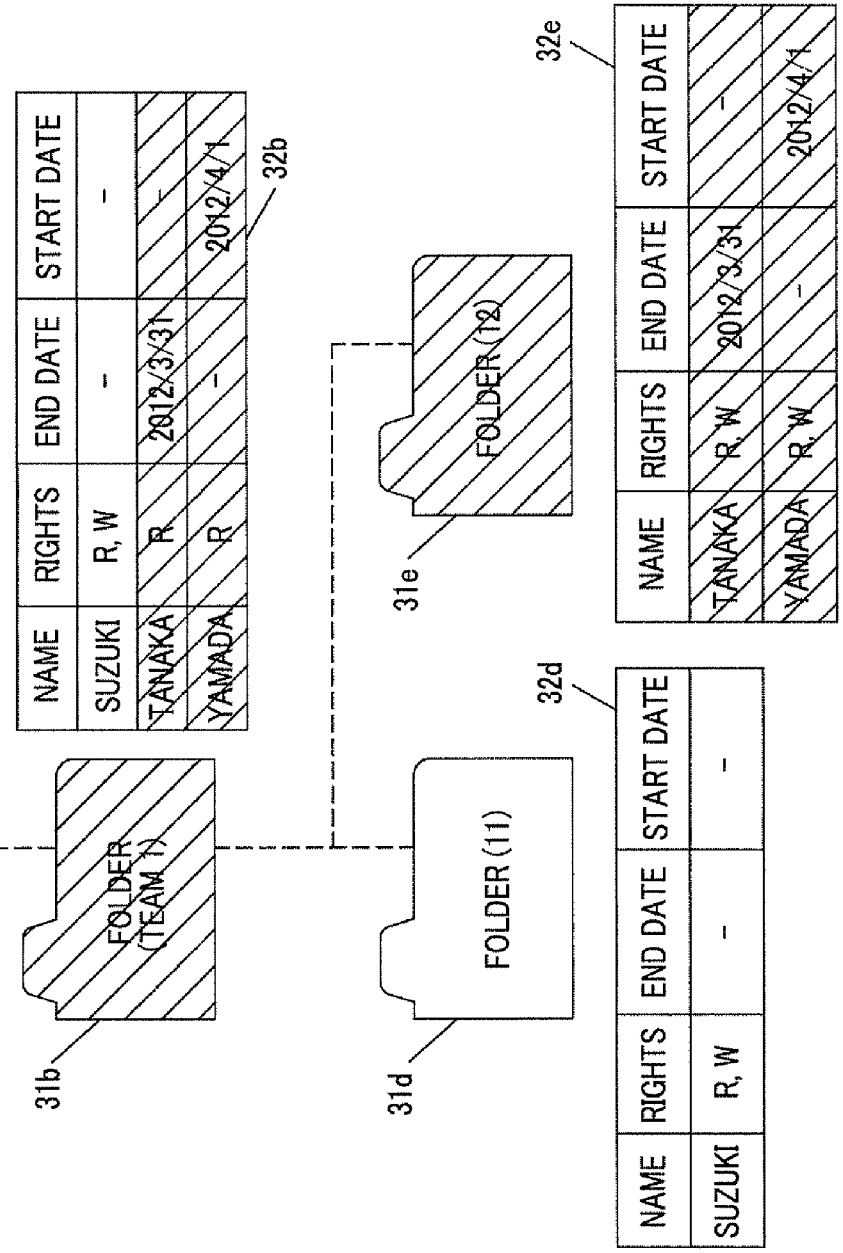

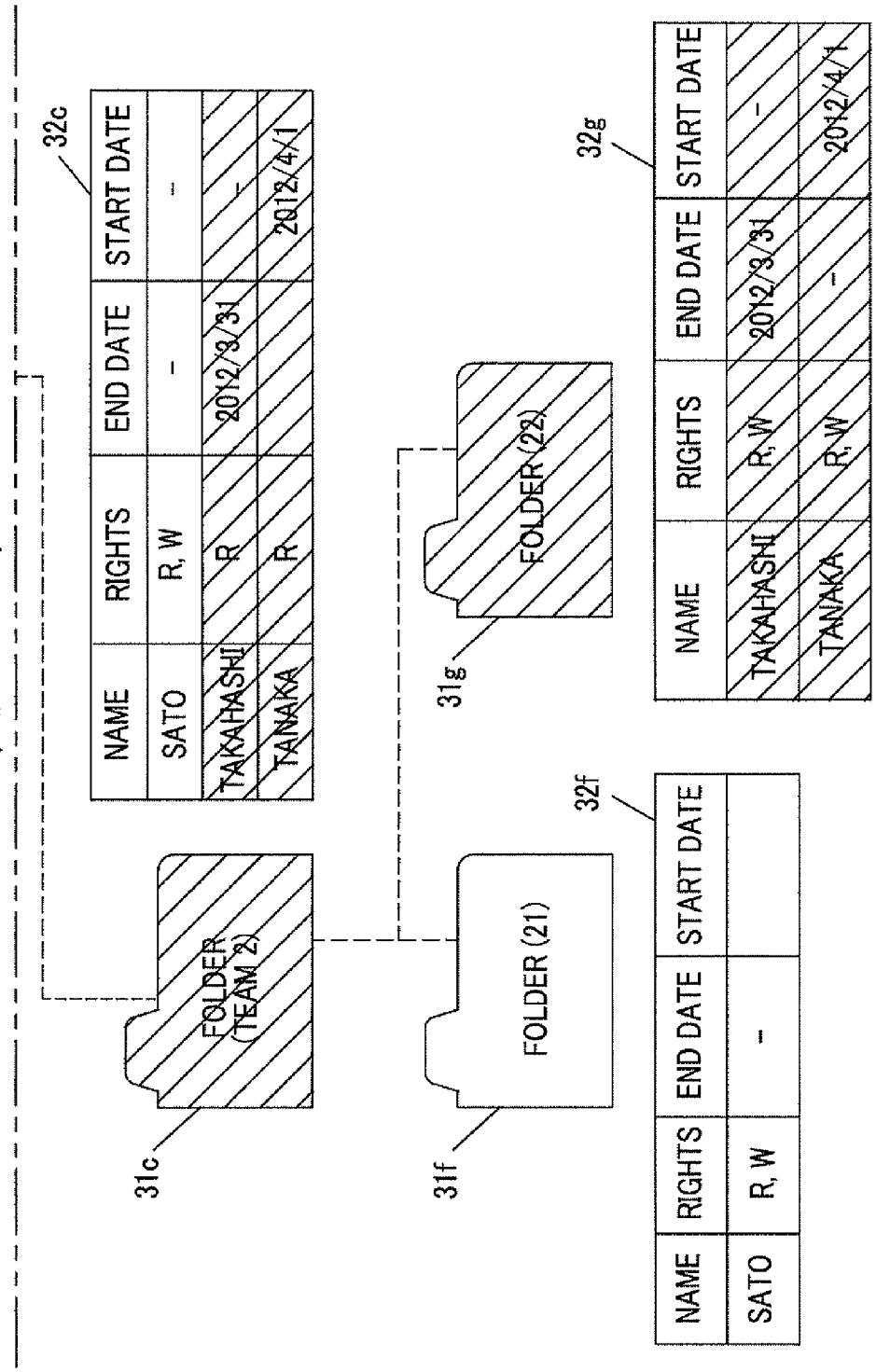

NON-TRANSITORY COMPUTER READABLE MEDIUM STORING ACCESS RIGHTS UPDATE PROGRAM, ACCESS RIGHTS MANAGEMENT SYSTEM, AND ACCESS RIGHTS UPDATE METHOD

CROSS-REFERENCE TO RELATED APPLICATIONS

This application is based on and claims priority under 35 USC 119 from Japanese Patent Application No. 2012-062374 filed Mar. 19, 2012.

BACKGROUND (i) Technical Field

The present invention relates to a non-transitory computer readable medium storing an access rights update program, an access rights management system, and an access rights update method.

(ii) Related Art

Generally, in a document management system, a person in charge of registering the change of access rights associated with the announcement of personnel changes updates the access rights before the start of the personnel changes announcement day from the end of the day before the personnel changes announcement day so that the blank period of the access rights does not occur.

SUMMARY

According to an aspect of the invention, there is provided a non-transitory computer readable medium storing an access rights update program causing a computer to be executed as: an acquisition unit that acquires access rights update information, which includes information specifying an object of personnel changes, a type of personnel changes, a changed organization, a delegate of access rights for a storage unit that stores a document, and an effective period of the access rights, before the personnel changes; a search unit that searches for the storage unit, for which access rights information including the effective period of the access rights is set and which needs to be updated, on the basis of the access rights update information acquired by the acquisition unit; and an update unit that updates the access rights information, which is set for the storage unit searched for by the search unit, before the personnel changes on the basis of the access rights update information acquired by the acquisition unit.

BRIEF DESCRIPTION OF THE DRAWINGS

Exemplary embodiments of the present invention will be described in detail based on the following figures, wherein:

FIG. 5 is a flow chart showing an example of the operation of searching for a folder for which the access rights information needs to be updated;

FIG. 6 is a flow chart showing an example of the operation of access rights update;

FIG. 7 is a view showing an example of access rights information after updating in a first case;

DETAILED DESCRIPTION

Figure 1:
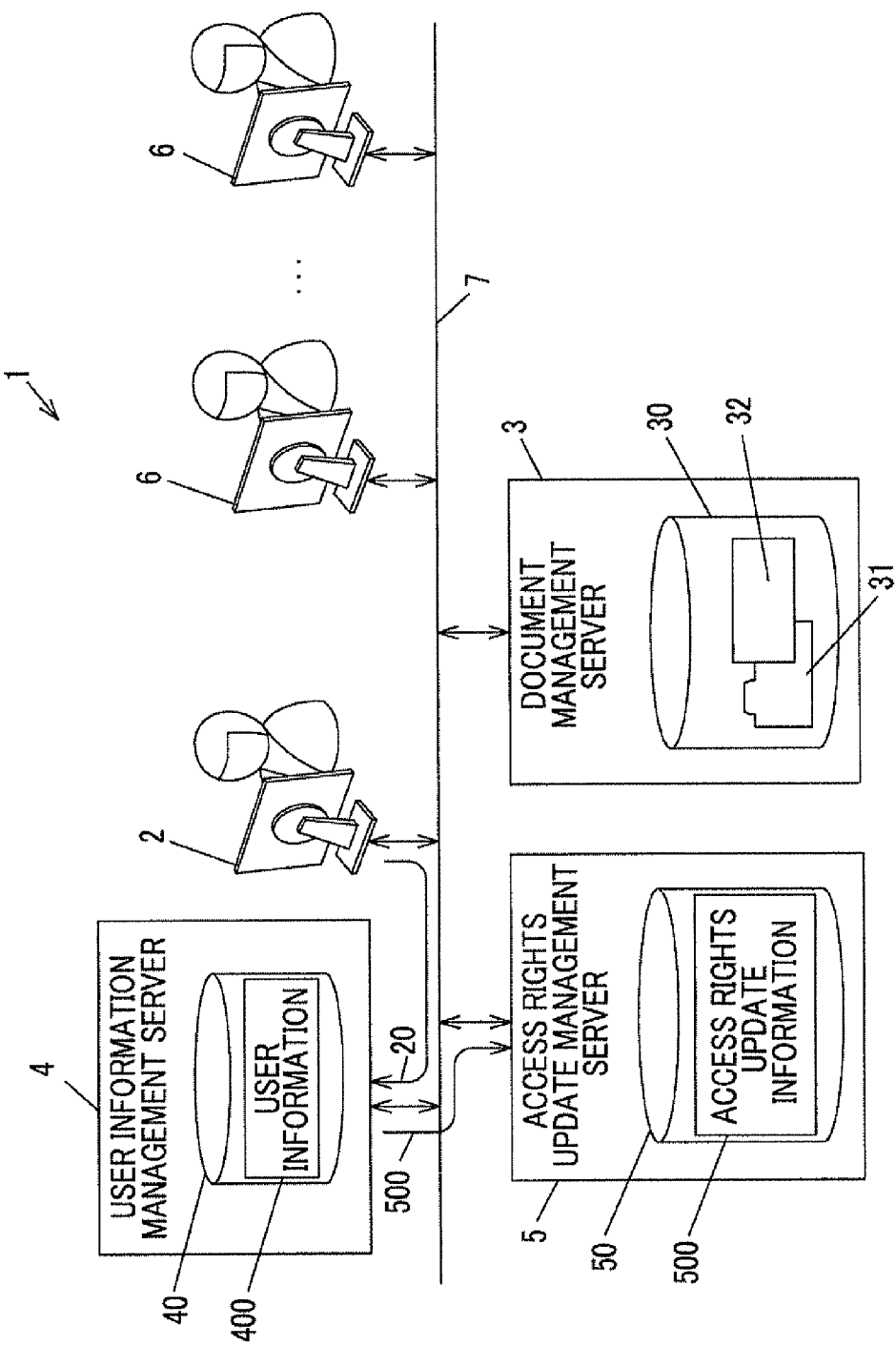
FIG. 1 is a view showing an example of the schematic configuration of an access rights management system according to an exemplary embodiment of the invention.

Hereinafter, exemplary embodiments of the invention will be described with reference to the accompanying drawings. Moreover, in the drawings, components having substantially the same functions are denoted by the same reference numerals, and repeated explanation thereof will be omitted.

FIG. 1 is a view showing an example of the schematic configuration of an access rights management system according to an exemplary embodiment of the invention. An access rights management system 1 includes an administrator terminal 2 operated by the administrator of the system 1, a document management server 3, a user information management server 4, an access rights update management server 5, and plural user terminals 6 operated by users other than the administrator, all of which are connected to each other through a network 7. The document management server 3 is an example of a document management unit.

Document Management Server

The document management server 3 includes: a memory 30 configured to include a ROM, a RAM, an HDD, and the like; and a controller (not shown) configured to include a CPU and the like. A folder 31 in which a document is stored, access rights information 32 set for the folder 31, a program of a CPU, and the like are stored in the memory 30. The memory 30 is a repository of the folder 31 and the access rights information 32. The folder 31 is an example of a storage unit that stores a document.

Administrator Terminal

The administrator terminal 2 receives an administrator ID (identification information) from the administrator, accepts personnel change information 20 if the administrator ID matches an administrator ID (not shown) held in the user information management server 4, and transmits the personnel change information 20 to the user information management server 4.

The personnel change information 20 includes a name of a user who is an object of personnel changes, for example, an employee, a user ID (identification information), types of personnel changes ("new" which means joining a company, "update" which means a change, "delete" which means resignation, and the like), a work transfer department, an assigned organization, a hiring date, a change date, a resignation date, and the like. The user's name or the user ID is an example of information specifying the object of personnel changes.

User Information Management Server

The user information management server 4 includes: a memory 40 configured to include a ROM, a RAM, an HDD, and the like; and a controller (not shown) configured to include a CPU and the like. User information 400, a program of a CPU, and the like are stored in the memory 40.

The user information management server 4 changes the user information 400, which is stored in the memory 40, on the basis of the personnel change information 20 transmitted from the administrator terminal 2 and also generates access rights update information 500, and transmits the access rights update information 500 to the access rights update management server 5 before personnel changes.

The user information 400 stored in the memory 40 includes a name of a user who is an employee, a user ID (identification information), an organization, a job title, sex, age, an address, a telephone number, an e-mail address, family structure, a hiring date, a resignation date, and the like.

The user information management server 4 generates the access rights update information 500 using the personnel change information 20. In this case, the user information management server 4 sets a resignation date or a change date as an end date (date on which the access rights are invalidated) of the access rights of the user, and sets a hiring date or a change date as a start date (date on which the access rights are validated) of the access rights of the user. In addition, when a work transfer department is included in the personnel change information 20, the user information management server 4 determines that the access rights have also been delegated and sets the work transfer department as a delegate of the access rights.

As shown in FIG. 7 described later, the access rights update information 500 includes a user's name, type (new, update, delete, and the like) of personnel changes, an assigned organization, a delegate when the access rights are delegated, an end date (resignation date or change date) of the access rights, a start date (hiring date or change date) of the access rights, and the like. An "effective period" of the access rights refers to a period from the start date of the access rights to the end date.

Access Rights Update Management Server

The access rights update management server 5 includes: a memory 50 configured to include a ROM, a RAM, an HOD, and the like; and a controller configured to include a CPU and the like. The access rights update management server 5 stores the access rights update information 500 transmitted from the user information management server 4 in a memory 50 and also updates the access rights information 32, which is stored in the memory 30 of the document management server 3, on the basis of the access rights update information 500 before personnel changes. That is, when an end date or a start date is recorded in the access rights update information 500, the access rights update management server 5 performs updating before these dates.

The access rights update management server 5 grants the minimum rights (for example, reading rights) to the root folder 31 related to the assigned organization when the type of personnel changes is "new" or "update".

Figure 2:
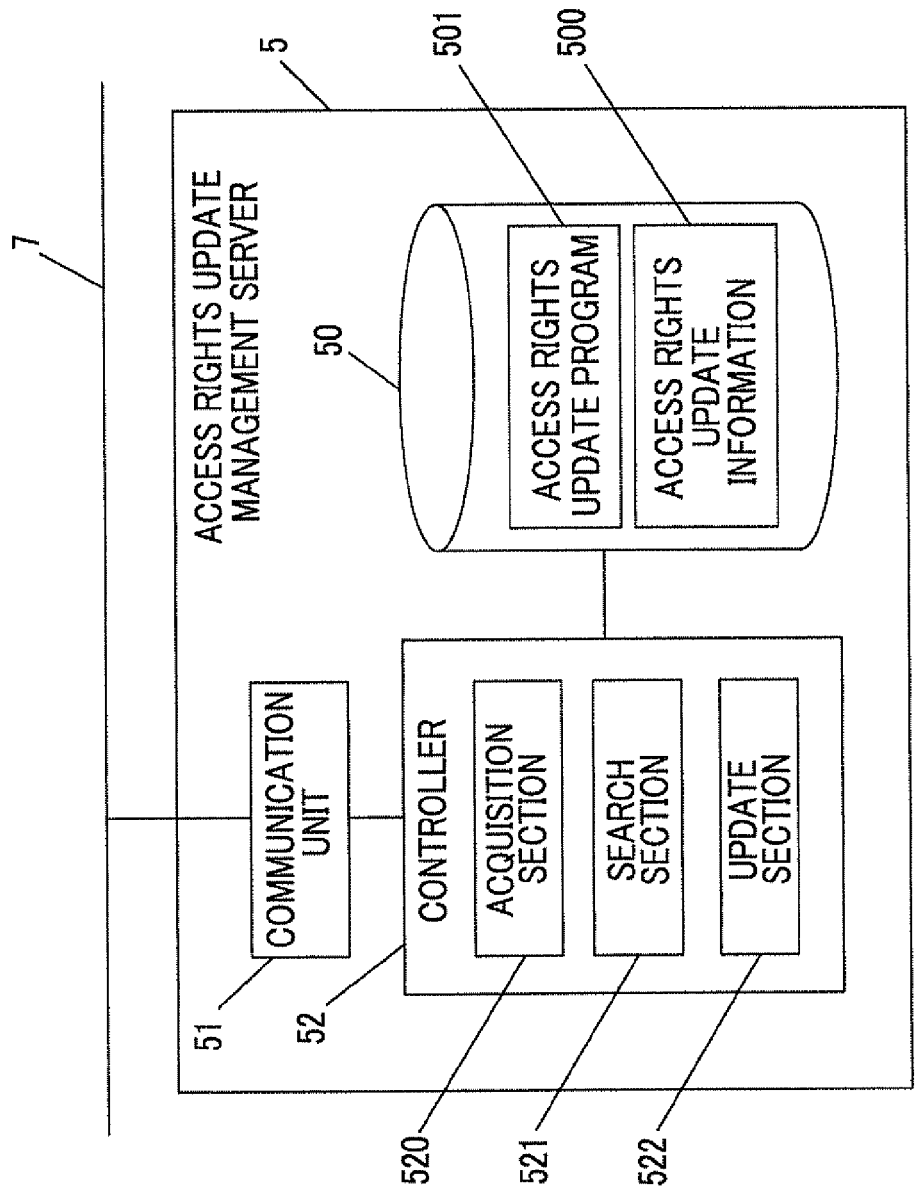
FIG. 2 is a block diagram showing a detailed configuration example of an access rights update management server.

FIG. 2 is a block diagram showing a detailed configuration example of the access rights update management server 5. The access rights update management server 5 includes a communication unit 51 connected to the network 7, a controller 52 configured to include a CPU and the like, and the above-described memory 50.

The above-described access rights update information 500 and information of an access rights update program and the like are stored in the memory 50.

The CPU of the controller 52 functions as an acquisition section 520, a search section 521, update section 522, and the like by operating according to an access rights update program 501.

The acquisition section 520 acquires the access rights update information 500 from the user information management server 4 before personnel changes.

The search section 521 searches for the folder 31, for which the access rights information 32 needs to be updated, on the basis of the access rights update information 500 acquired by the acquisition section 520.

The update section 522 updates the access rights information 32, which is set for the folder 31 searched for by the search section 521, before personnel changes. In addition, when there is no user capable of accessing the folder 31 after the effective period of the access rights, the update section 522 sets the access rights, which are set for the parent folder 31 of the folder 31, for the folder 31.

In addition, a part or all of each controller of the document management server 3, the user information management server 4, and the access rights update management server 5 may be formed by a hardware circuit, such as a reconfigurable circuit (FPGA: Field Programmable Gate Array) and an application specific integrated circuit (ASIC).

Storage Content of a Memory of a Document Management Server

Figure 3:
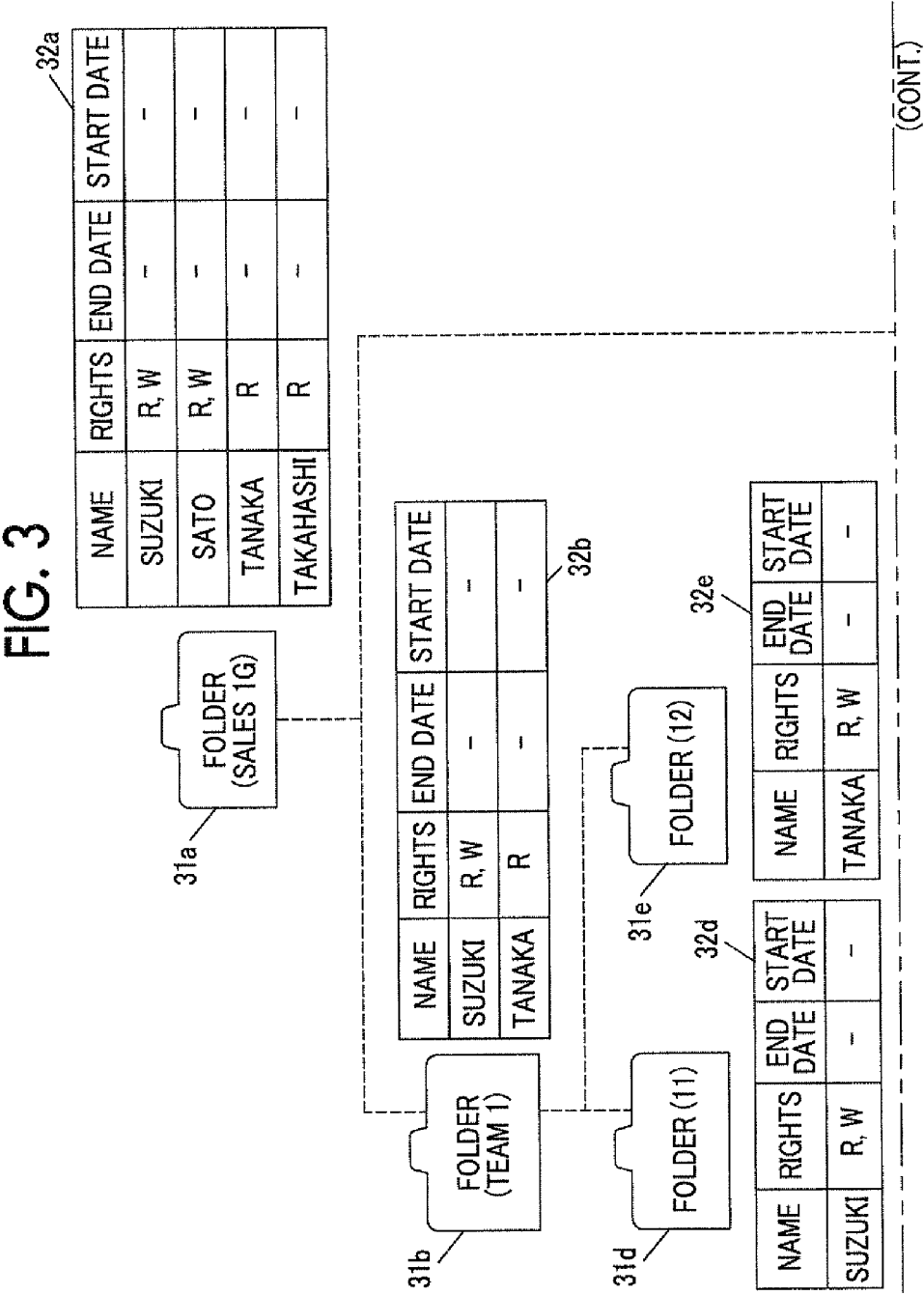
FIG. 3 is a view showing an example of the hierarchical structure of folders and access rights information before updating which are stored in a memory of a document management server.

FIG. 3 is a view showing an example of the hierarchical structure of the folder 31 (31a to 31g) and the access rights information 32 (32a to 32g) before updating which are stored in the memory 30 of the document management server 3.

The folders 31a to 31g stored in the memory 30 of the document management server 3 have a hierarchical structure of a tree structure, as shown in FIG. 3. The folder (team 1) 31b and the folder (team 2) 31c are present below the root folder (sales 1G) 31a. The folder (11) 31d and the folder (12) 31e are present below the folder (team 1) 31b. The folder (21) 31f and the folder (22) 31g are present below the folder (team 2) 31c. A document is stored in each of the folders 31a to 31g. Here, "sales 1G" is an example of the organization, and "team 1" and "team 2" indicate organizations belonging to "sales 1G". The access rights information items 32a to 32g are set for the folders 31a to 31g, respectively.

In the access rights information 32 set for the folder 31, a name of a user capable of accessing the corresponding folder 31, access rights granted to the user, a start date which is an effective date of the access rights, and an end date which is an invalid date of the access rights are defined. Rights permitting to perform each operation of reading, writing, printing, transmission, and the like for the folder 31 and documents stored in the folder 31 are included in the access rights.

Operations of the Exemplary Embodiment

Figure 4:
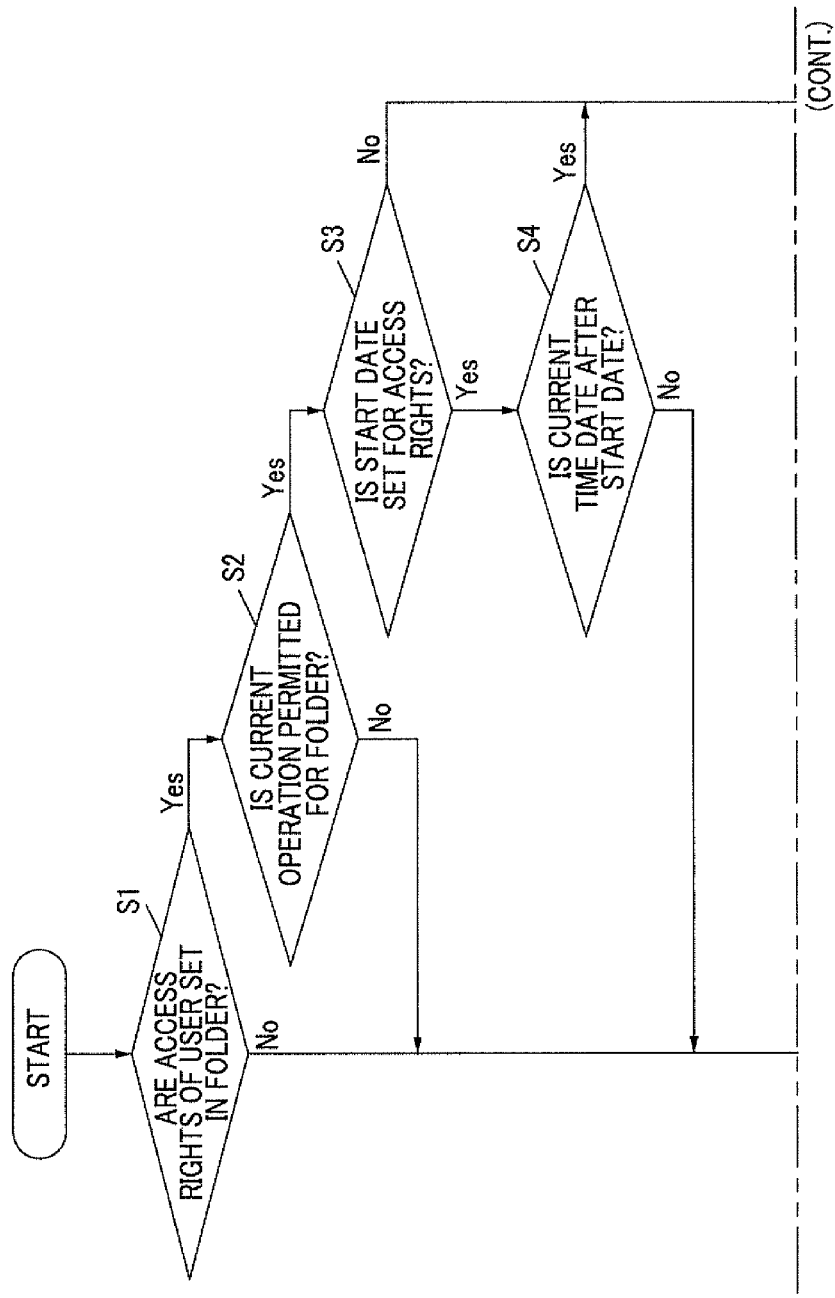
FIG. 4 is a flow chart showing an example of the control operation of the access rights.

Next, an example of the operation of the access rights management system 1 will be described with reference to the flow charts shown in FIGS. 4 to 6.

(1) Control Operation of the Access Rights

First, an example of the control operation of the access rights will be described with reference to FIGS. 3 and 4. FIG. 4 is a flow chart showing an example of the control operation of the access rights.

It is assumed that the access rights information 32 before updating is as shown in FIG. 3, for example. That is, noting the user "Takahashi" who is an employee, reading (R) rights are granted to "Takahashi" in the access rights information 32a set for the folder (sales 1G) 31a. In the access rights information 32c set for the folder (team 2) 31c, rights reading (R) are granted to "Takahashi". In the access rights information 32g set for the folder (22) 31g, reading (R) and writing (W) rights are granted to "Takahashi".

When a user operates the user terminal 6 to access the folder 31 stored in the memory 30 of the document management server 3 and performs an operation, such as reading, the document management server 3 determines whether or not the access rights of the user are set for the accessed folder 31 (S1). If the access rights are set (S1: Yes), the document management server 3 determines whether or not the current operation is permitted for the folder 31 (S2). If the current operation is permitted (S2: Yes), the document management server 3 determines whether or not the start date is set for the access rights (S3). If the start date is set (S3: Yes), the document management server 3 determines whether or not the current time is a date after the start date (S4). If the current time is a date after the start date (S4: Yes), the document management server 3 determines whether or not the end date is set for the access rights (S5). If the end date is set (S5: Yes), the document management server 3 determines whether or not the current time is a date before the end date (S6). If the current time is a date before the end date (S6: Yes), the document management server 3 determines that it is possible to access the folder 31 (S7).

When the access rights are not set in the above step S1 (S1: No), when the current operation is not permitted for the folder 31 in the above step S2 (S2: No), when the current time is not a date after the start date in the above step S4 (S4: No), and when the current time is not a date before the end date in the above step S6 (S6: No), the document management server 3 determines that it is not possible to access the folder 31 (S8).

(2) Folder Search Operation

Next, an example of the operation of searching for the folder 31 by the access rights update management server 5 will be described with reference to FIG. 5. FIG. 5 is a flow chart showing an example of the operation of searching for the folder 31 for which the access rights information needs to be updated.

Figure 9:
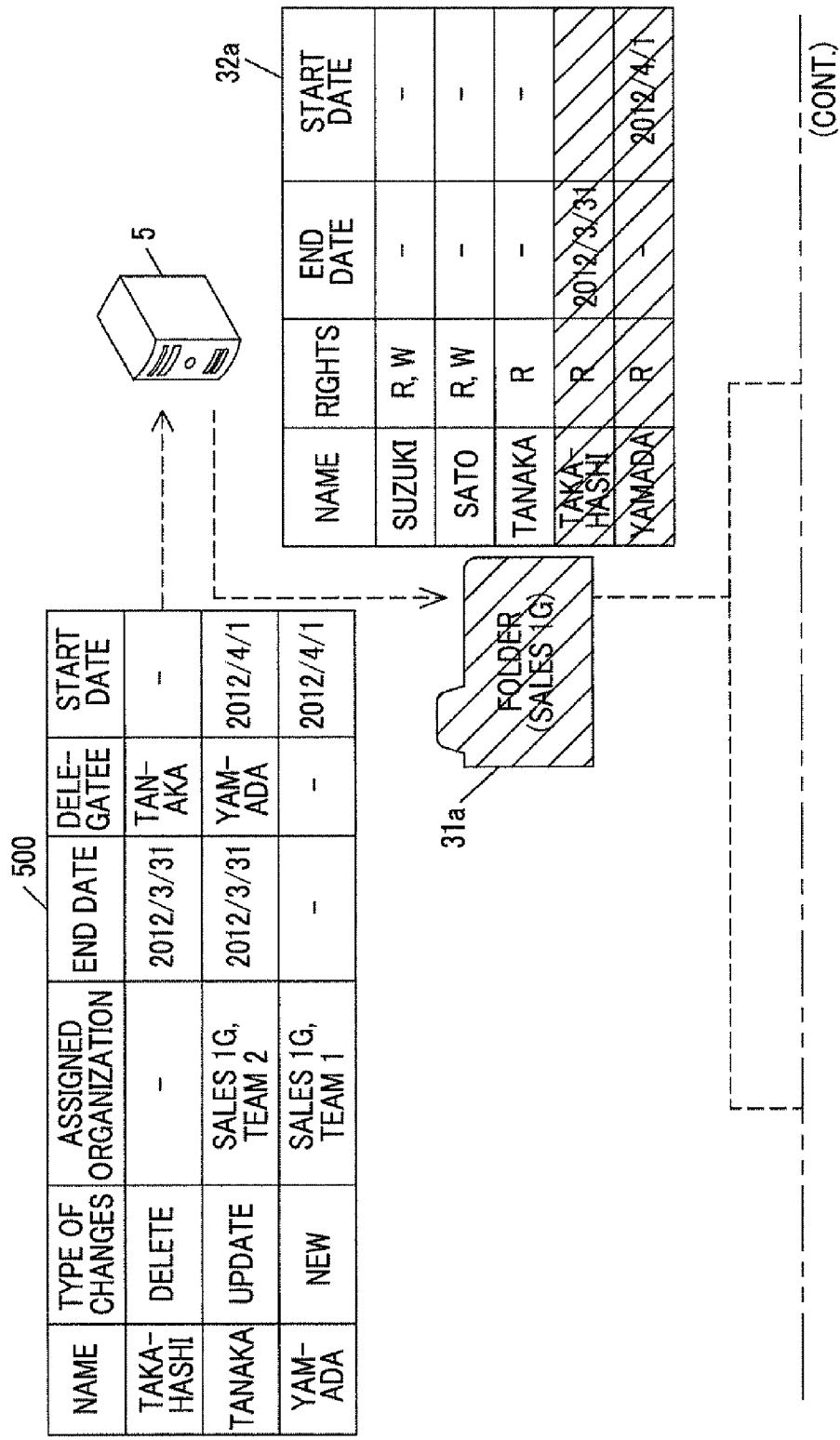
FIG. 9 is a view showing an example of access rights information after updating in a third case.

When the acquisition section 520 of the access rights update management server 5 acquires the access rights update information 500 (S11), the search section 521 accesses the root folder 31 of the plural folders 31 stored in the memory 30 of the document management server 3 and executes "access rights update processing" shown in FIG. 9 which will be described later (S12). In addition, the "access rights update processing" shown in FIG. 9 is executed by the update section 522 (the same as in the following steps).

All sub-folders (for example, child folders) of the currently accessed folder (first, a root folder) are accessed (S13). The "access rights update processing" shown in FIG. 9, which will be described later, is executed for the accessed sub-folder (for example, a child folder) (S14).

It is determined whether or not a sub-folder (for example, a grandchild folder) is further present in the accessed sub-folder (for example, a child folder) (S15). If there is no sub-folder (for example, a grandchild folder) (S15: No), it is determined whether or not a user capable of accessing the currently accessed folder (for example, a child folder) is present (S16). If there is no user capable of accessing the currently accessed folder (S16: No), access rights set for the parent folder (for example, a root folder) of the currently accessed folder (child folder) are granted (S17). The above process is executed until the processing on all sub-folders ends (S18). In addition, the above step S17 is executed by the update section 522.

(3) Operation of Access Rights Update

Next, an example of the operation of access rights update will be described with reference to FIG. 6. FIG. 6 is a flow chart showing an example of the operation of access rights update.

For all users subjected to personnel changes which are included in the access rights update information 500, it is determined whether the types of the changes correspond to "delete" or "update" (S21). If the types of the changes correspond to "delete" or "update" (S21: Yes), the date designated in the end date of the current user subjected to personnel changes is set in the "end date" column of the access rights of the access rights information 32 corresponding to the currently accessed folder 31. When the user is designated as the delegate of the access rights, the delegated user is registered in the access rights information 32 (S22). The above steps S21 and S22 are executed until the processing on all users subjected to personnel changes ends.

For all users subjected to personnel changes which are included in the access rights update information 500, it is determined whether the types of the changes correspond to "update" or "new" (S23). If the types of the changes correspond to "update" or "new" (S23: Yes), it is determined whether or not there is a user who delegates the access rights to the current user subjected to personnel changes (S24). When there is a user who delegates the access rights (S24: Yes), the same access rights as the delegating user are granted to the delegated user, and the date designated in the start date of the delegated user is set in the "start date" column of the access rights of the access rights information 32 (S25).

If there is no user who delegates the access rights to the current user subjected to personnel changes in the above step S24 (S24: No), it is determined whether or not a predetermined percentage (for example, 60%) or more of users to whom access rights for the current folder 31 are granted belong to the same group as the current user subjected to personnel changes (S26). If a predetermined percentage (for example, 60%) or more of users belong to the same group as the current user subjected to personnel changes (S26: Yes), the minimum access rights set for the current user subjected to personnel changes are granted, and the date designated in the start date is set in the "start date" column of the access rights information 32 (S27). The above steps are executed until the processing on all users subjected to personnel changes ends.

(4) First Case of Specific Examples

Next, a first case of specific examples will be described with reference to FIGS. 3 and 7. FIG. 7 is a view showing an example of access rights information after updating in the first case. In the first case, "Takahashi" resigns, and "Yamada" is assigned to the same sales 1G and team 2 as "Takahashi".

(4-1) Acquisition of Access Rights Update Information

It is assumed that the acquisition section 520 of the access rights update management server 5 has acquired the access rights update information 500 shown in FIG. 7, for example. The access rights update information 500 shown in FIG. 7 acquired by the acquisition section 520 indicates that the type of changes of "Takahashi" is "delete", end date of the access rights that "Takahashi" has is 2012 Mar. 31, delegate of the access rights that "Takahashi" has is "Yamada", the type of changes of "Yamada" is "new", and start date of the access rights that "Yamada" has is 2012 Apr. 1.

(4-2) Folder Search

The search section 521 of the access rights update management server 5 searches for the folder 31, for which the access rights information 32 needs to be updated, on the basis of the access rights update information 500. In the case shown in FIG. 7, the search section 521 searches for the folder (sales 1G) 31*a*, the folder (team 2) 31*c*, and the folder (22) 31*g* as folders to be updated, as shown by diagonal lines in FIG. 7.

(4-3) Access Rights Update

The update section 522 of the access rights update management server 5 updates the access rights information 32*a*, 32*c*, and 32*g*, which is set for the folder (sales 1G) 31*a*, the folder (team 2) 31*c*, and the folder (22) 31*g* searched for by the search section 521, on the basis of the access rights update information 500.

That is, for the access rights information 32*a* set for the folder (sales 1G) 31*a*, the update section 522 sets 2012 Mar. 31 in the "end date" column of the access rights of "Takahashi", sets the same reading (R) as for "Takahashi" in the "rights" column of "Yamada" who takes over the access rights of "Takahashi", and sets 2012 Apr. 1 in the "start date" column of the access rights (S22 in FIG. 6).

For the access rights information 32c set for the folder (team 2) 31c, the update section 522 sets 2012 Mar. 31 in the "end date" column of the access rights of "Takahashi", sets the same reading (R) as for "Takahashi" in the "rights" column of "Yamada" who takes over the access rights of "Takahashi", and sets 2012 Apr. 1 in the "start date" column of the access rights (S22 in FIG. 6).

For the access rights information 31g set for the folder (22) 31g, the update section 522 sets 2012 Mar. 31 in the "end date" column of the access rights of "Takahashi", sets the same reading (R) and writing (W) as for "Takahashi" in the "rights" column of "Yamada" who takes over the access rights of "Takahashi", and sets 2012 Apr. 1 in the "start date" column of the access rights (S22 in FIG. 6).

By the above update of the access rights information 32, the user "Takahashi" is able to perform reading for the folder (sales 1G) 31a and the folder (team 2) 31c and reading and writing for the folder (22) 31g until 2012 Mar. 31 by operating the user terminal 6.

On 2012 Apr. 1, the user "Takahashi" is not able to access any folder 31, and the user "Yamada" who takes over the access rights of "Takahashi" is able to perform reading of the folder (sales 1G) 31a and the folder (team 2) 31c and reading and writing of the folder (22) 31g in the same manner as "Takahashi" by operating the user terminal 6.

(5) Second Case of Specific Examples

Figure 8:
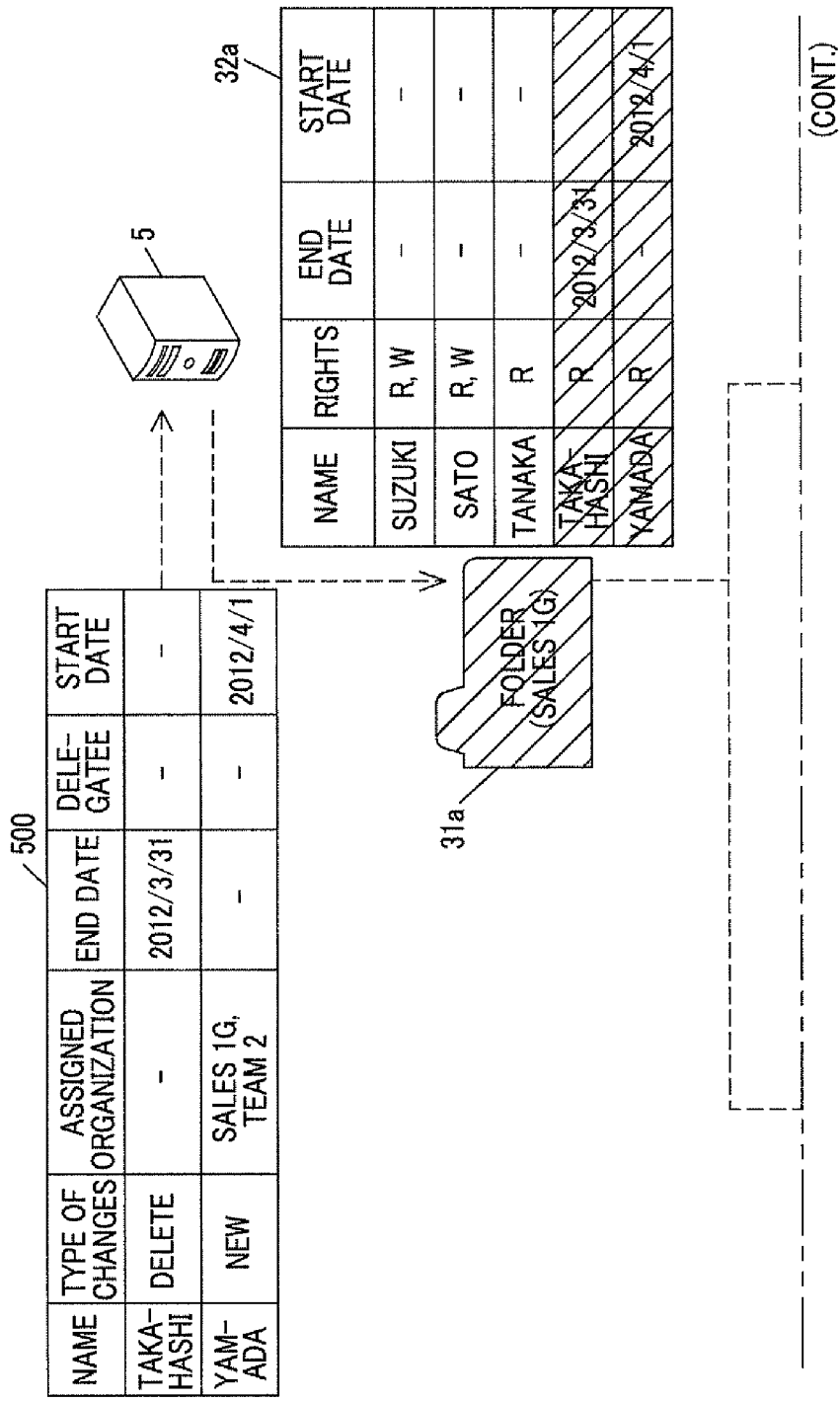
FIG. 8 is a view showing an example of access rights information after updating in a second case.

Next, a second case of specific examples will be described with reference to FIGS. 3 and 8. FIG. 8 is a view showing an example of access rights information after updating in the second case. The explanation will be given below. In the second case, "Takahashi" resigns, "Yamada" joins the company, and the assigned organization is sales 1G and a team has not yet been decided.

(5-1) Acquisition of Access Rights Update Information

It is assumed that the acquisition section 520 of the access rights update management server 5 has acquired the access rights update information 500 shown in FIG. 8. The access rights update information 500 shown in Fig. 8 acquired by the acquisition section 520 indicates that the type of changes of "Takahashi" is "delete", end date of the access rights that "Takahashi" has is 2012 Mar. 31, access rights that "Takahashi" has is not delegated, the type of changes of "Yamada" is "new", assigned organization of "Yamada" is sales 1G (team has not yet been decided), and start date of the access rights that "Yamada" has is 2012 Apr. 1.

Since the hierarchical structure of the folder 31 before changing the access rights information 32 and the access rights information 32 set for each folder 31 are the same as those shown in FIG. 3, explanation thereof will be omitted.

(5-2) Folder Search

The search section 521 of the access rights update management server 5 searches for the folder 31, for which the access rights information 32 needs to be updated, on the basis of the access rights update information 500. In the case shown in FIG. 8, the search section 521 searches for the folder (sales 1G) 31a, the folder (team 2) 31c, and the folder (22) 31g as folders to be updated, as shown by diagonal lines in FIG. 8.

(5-3) Access Rights Update

The update section 522 of the access rights update management server 5 updates the access rights information 32a, 32c, and 32g, which is set for the folder (sales 1G) 31a, the folder (team 2) 31c, and the folder (22) 31g searched for by the search section 521, on the basis of the access rights update information 500.

That is, for the access rights information 32a set for the folder (sales 1G) 31a, the update section 522 sets 2012 Mar. 31 in the "end date" column of the access rights of "Takahashi" (522 in FIG. 6). The update section 522 sets reading (R) for the minimum access rights in the "rights" column of new "Yamada", and sets 2012 Apr. 1 in the "start date" column of the access rights (327 in FIG. 6). Since 60% or more of users set for the folder (sales 1G) 31a belong to the registered sales 1G, the update section 522 sets reading (R) for the minimum access rights of the rights granted to each user.

For the access rights information 32c set for the folder (team 2) 31c, the update section 522 sets 2012 Mar. 31 in the "end date" column of the access rights of "Takahashi" (S22 in FIG. 6). Since nobody takes over the access rights of "Takahashi", there is no new addition in this case.

For the access rights information 31g set for the folder (22) 31g, the update section 522 sets 2012 Mar. 31 in the "end date" column of the access rights of "Takahashi" (S22 in FIG. 6). The access rights for the folder (22) 31g are set only for "Takahashi". Therefore, in order to avoid a situation where "Takahashi" resigns and no one is able to access the folder (22) 31g, a person capable of accessing the parent folder (team 2) 31c of the folder (22) 31g is set for the folder (22) 31g (S17 in FIG. 5). In the case shown in FIG. 8, for the access rights information 32g set for the folder (22) 31g, reading (R) and writing (W) rights of "Sato" are set as in the access rights information 32c set for the parent folder (team 2) 31c of the folder (22) 31g, and 2012 Apr. 1 is set in the "start date" column.

By the above update of the access rights information 32, the user "Takahashi" is able to perform reading for the folder (sales 1G) 31a and the folder (team 2) 31c and reading and writing for the folder (22) 31g until 2012 Mar. 31 by operating the user terminal 6.

On 2012 Apr. 1, the user "Takahashi" is not able to access any folder 31, and "Yamada" is able to perform reading for the root folder (sales 1G) 31a by operating the user terminal 6. "Sato" is able to perform reading and writing for the folder (22) 31g.

(6) Third Case of Specific Examples

Next, a third case of specific examples will be described with reference to FIGS. 3 and 9. FIG. 9 is a view showing an example of access rights information after updating in the third case. The explanation will be given below. In the third case, "Tanaka" takes over the rights of "Takahashi", and "Yamada" takes over the rights of "Tanaka". In the third case, members of team 1 are "Suzuki" and "Tanaka" and members of team 2 are "Sato" and "Takahashi", but "Takahashi" resigns, "Tanaka" moves from team 1 to team 2, and "Yamada" is added to team 1. As a result, members of team 1 are changed to "Suzuki" and "Yamada", and members of team 2 are changed to "Sato" and "Tanaka".

(6-1) Acquisition of Access Rights Update Information

It is assumed that the acquisition section 520 of the access rights update management server 5 has acquired the access rights update information 500 shown in FIG. 9. The access rights update information 500 shown in FIG. 9 acquired by the acquisition section 520 indicates that the type of changes of "Takahashi" is "delete", end date of the access rights that "Takahashi" has is 2012 Mar. 31, delegate of the access rights that "Takahashi" has is "Tanaka", the type of changes of "Tanaka" is "update", end date of the access rights that "Tanaka" has is 2012 Mar. 31, delegate of the access rights that "Tanaka" has is "Yamada", and start date of the access rights that "Yamada" has is 2012 Apr. 1.

Since the hierarchical structure of the folder 31 before changing the access rights information 32 and the access rights information are the same as those shown in FIG. 3, explanation thereof will be omitted.

(6-2) Folder Search

The search section 521 of the access rights update management server 5 searches for the folder 31, for which the access rights information 32 needs to be updated, on the basis of the access rights update information 500. In the case shown in FIG. 9, the search section 521 searches for the folder (sales 1G) 31*a*, the folder (team 1) 31*b*, the folder (team 2) 31*c*, the folder (12) 31*e*, and the folder (22) 31*g* as folders to be updated, as shown by diagonal lines in FIG. 9.

(6-3) Access Rights Update

The update section 522 of the access rights update management server 5 updates the access rights information 32*a*, 32*b*, 32*c*, 32*d*, 32*e*, 32*f*, and 32*g*, which is set for the folder (sales 1G) 31*a*, the folder (team 1) 31*b*, the folder (team 2) 31*c*, the folder (12) 31*e*, and the folder (22) 31*g* searched for by the search section 521, on the basis of the access rights update information 500.

That is, for the access rights information 32*a* set for the folder (sales 1G) 31*a*, the update section 522 sets 2012 Mar. 31 in the "end date" column of the access rights of "Takahashi", sets the same reading (R) as for "Takahashi" in the "rights" column of "Tanaka" who takes over the access rights of "Takahashi", and sets 2012 Apr. 1 in the "start date" column of the access rights (S22 in FIG. 6).

For the access rights information 32*b* set for the folder (team 1) 31*b*, the update section 522 sets 2012 Mar. 31 in the "end date" column of the access rights of "Tanaka", sets the same reading (R) as the rights of "Tanaka" in the "rights" column of "Yamada" who takes over the access rights of "Tanaka", and sets 2012 Apr. 1 in the "start date" column of the access rights (S22 in FIG. 6).

For the access rights information 32*c* set for the folder (team 2) 31*c*, the update section 522 sets 2012 Mar. 31 in the "end date" column of the access rights of "Takahashi", sets the same reading (R) as the rights of "Takahashi" in the "rights" column of "Tanaka" who takes over the access rights of "Takahashi", and sets 2012 Apr. 1 in the "start date" column of the access rights (S22 in FIG. 6).

For the access rights information 32*e* set for the folder (12) 31*e*, the update section 522 sets 2012 Mar. 31 in the "end date" column of the access rights of "Tanaka", sets the same reading (R) as the rights of "Tanaka" in the "rights" column of "Yamada" who takes over the access rights of "Tanaka", and sets 2012 Apr. 1 in the "start date" column of the access rights (S22 in FIG. 6).

For the access rights information 31*g* set for the folder (22) 31*g*, the update section 522 sets 2012 Mar. 31 in the "end date" column of the access rights of "Takahashi", sets the same reading (R) as the rights of "Takahashi" in the "rights" column of "Tanaka" who takes over the access rights of "Takahashi", and sets 2012 Apr. 1 in the "start date" column of the access rights (S22 in FIG. 6).

By the above update of the access rights information 32, the user "Takahashi" is able to perform reading for the folder (sales 1G) 31*a* and the folder (team 2) 31*c* and reading and writing for the folder (22) 31*g* until 2012 Mar. 31 by operating the user terminal 6. The user "Tanaka" is able to perform reading for the folder (team 2) 31*c* and the folder (12) 31*e* until 2012 Mar. 31 by operating the user terminal 6. In addition, the user "Tanaka" is able to perform reading for the folder (sales 1G) 31*a* even after 2012 Mar. 31.

On 2012 Apr. 1, the user "Takahashi" is not able to access any folder 31, and "Yamada" is able to perform reading of the folder (sales 1G) 31*a* and the folder (team 1) 31*b* and reading and writing for the folder (12) by operating the user terminal 6.

(Effects of the Exemplary Embodiment)

According to the present exemplary embodiment, the following effects are obtained.

(a) Even if the transfer of the work occurs due to personnel changes, it is possible to reduce the burden of updating the access rights.

(b) It is possible to set the access rights for each folder 31.

(c) It is possible to avoid a situation where no one is able to access the folder 31 with a hierarchical structure.

(d) When acquiring the access rights update information, it is possible to use the personnel change information.

While the exemplary embodiment of the invention has been described, the invention is not limited to the exemplary embodiment described above, and various modifications and changes may be made within the scope and spirit of the invention. For example, the document management server 3, the user information management server 4, and the access rights update management server 5 may be unified as one or two servers. In addition, although the user information management server 4 generates the access rights update information 500 from the personnel change information 20 in the exemplary embodiment described above, the administrator terminal 2 may directly input the access rights update information 500 to the access rights update management server 5.

In addition, within the scope and spirit of the invention, some components in the exemplary embodiment described above may be omitted, and addition, deletion, change, replacement, and the like of steps are possible in the flow of the exemplary embodiment described above. In addition, a program used in the exemplary embodiment described above may be provided in a state recorded on a computer readable recording medium, such as a CD-ROM.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A non-transitory computer readable medium storing an access rights update program causing a computer to be executed as:
   an acquisition unit that acquires access rights update information, wherein the access rights update information includes information specifying an object of personnel changes, a type of personnel changes, a changed organization, a delegatee of access rights for a storage unit that stores a document, and an effective period of the access rights, before the personnel changes;
   a search unit that searches for the storage unit, for which access rights information including the effective period of the access rights is set and which needs to be updated based on the status of the personnel changes, on the basis of the access rights update information acquired by the acquisition unit; and
   an update unit that updates the access rights information, which is set for the storage unit searched for by the search unit, before the personnel changes on the basis of the access rights update information acquired by the acquisition unit.

2. The non-transitory computer readable medium according to claim 1,
wherein the storage unit includes a plurality of storage units with a hierarchical structure, and
the access rights information is set with the content corresponding to each storage unit, for each of the plurality of storage units.

3. The non-transitory computer readable medium according to claim 2,
wherein when there is no user capable of accessing the storage unit after the effective period of access rights, the update unit sets access rights, which are set for the parent storage unit of the storage unit, for the storage unit.

4. The non-transitory computer readable medium according to claim 1,
wherein when personnel change information is received and a work transfer department is included in the personnel change information, the acquisition unit generates the access rights update information with the work transfer department as the delegatee of the access rights.

5. The non-transitory computer readable medium according to claim 2,
wherein when personnel change information is received and a work transfer department is included in the personnel change information, the acquisition unit generates the access rights update information with the work transfer department as the delegatee of the access rights.

6. The non-transitory computer readable medium according to claim 3,
wherein when personnel change information is received and a work transfer department is included in the personnel change information, the acquisition unit generates the access rights update information with the work transfer department as the delegatee of the access rights.

7. An access rights management system comprising:
an acquisition unit that acquires access rights update information, wherein the access rights update information includes information specifying an object of personnel changes, a type of personnel changes, a changed organization, a delegatee of access rights for a storage unit that stores a document, and an effective period of the access rights, before the personnel changes;
a search unit that searches for the storage unit, for which access rights information including the effective period of the access rights is set and which needs to be updated based on the status of the personnel changes, on the basis of the access rights update information acquired by the acquisition unit;
an update unit that updates the access rights information, which is set for the storage unit searched for by the search unit, before the personnel changes on the basis of the access rights update information acquired by the acquisition unit; and
a document management unit that controls access from a user on the basis of the access rights information set for the storage unit.

8. An access rights update method comprising:
acquiring access rights update information, wherein the access rights update information includes information specifying an object of personnel changes, a type of personnel changes, a changed organization, a delegatee of access rights for a storage unit that stores a document, and an effective period of the access rights, before the personnel changes;
searching for the storage unit, for which access rights information including the effective period of the access rights is set and which needs to be updated based on the status of the personnel changes, on the basis of the acquired access rights update information; and
updating the access rights information, which is set for the searched storage unit, before the personnel changes on the basis of the acquired access rights update information.

* * * * *